(12) United States Patent
Lee et al.

(10) Patent No.: US 11,776,204 B2
(45) Date of Patent: Oct. 3, 2023

(54) 3D DATASET GENERATION FOR NEURAL NETWORK MODEL TRAINING

(71) Applicant: SONY GROUP CORPORATION, Tokyo (JP)

(72) Inventors: Jong Hwa Lee, San Diego, CA (US); Seunghan Kim, San Diego, CA (US); Gary Lyons, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 186 days.

(21) Appl. No.: 17/154,827

(22) Filed: Jan. 21, 2021

(65) Prior Publication Data

US 2021/0304516 A1 Sep. 30, 2021

Related U.S. Application Data

(60) Provisional application No. 63/003,028, filed on Mar. 31, 2020.

(51) Int. Cl.
*G06T 17/00* (2006.01)
*G06N 3/08* (2023.01)
(Continued)

(52) U.S. Cl.
CPC .......... *G06T 17/00* (2013.01); *G06F 18/214* (2023.01); *G06N 3/08* (2013.01); *G06T 7/529* (2017.01);
(Continued)

(58) Field of Classification Search
CPC ........ G06K 9/6256; G06N 3/08; G06T 17/00; G06T 17/10; G06T 19/20;
(Continued)

(56) References Cited

U.S. PATENT DOCUMENTS

2014/0043329 A1* 2/2014 Wang ................ G06V 10/446
345/420
2018/0068414 A1 3/2018 Savvides et al.
(Continued)

OTHER PUBLICATIONS

Jiang, et al., "3D Face Reconstruction With Geometry Details From a Single Image", IEEE, Transactions on Image Processing, vol. 27, No. 10, Oct. 2018, pp. 4756-4770.

*Primary Examiner* — Sing-Wai Wu
(74) *Attorney, Agent, or Firm* — CHIP LAW GROUP (57) ABSTRACT

An electronic device receives a set of 2D images comprising at least first 2D image of an object of interest and detects a plurality of 2D landmarks on the first 2D image. The detected plurality of 2D landmarks corresponds to shape-features of the object of interest. The electronic device aligns a first three-dimensional (3D) shape model of a reference object by fitting 2D landmarks of the first 3D shape model to the detected plurality of 2D landmarks. The electronic device estimates texture mapping information between the object of interest and the aligned first 3D shape model and generates a dataset by including the first 2D image, the aligned first 3D shape model, and the estimated texture mapping information as a first sample of the dataset. Based on the generated dataset, the electronic device trains a neural network model on a task of 3D reconstruction from a single 2D image.

18 Claims, 5 Drawing Sheets

(51) Int. Cl.
*G06T 7/529* (2017.01)
*G06T 19/20* (2011.01)
*G06V 40/16* (2022.01)
*G06T 17/10* (2006.01)
*G06F 18/214* (2023.01)
*G06V 10/764* (2022.01)
*G06V 10/774* (2022.01)
*G06V 10/82* (2022.01)
*G06V 10/54* (2022.01)
*G06V 10/44* (2022.01)
*G06V 20/64* (2022.01)
*G06V 40/10* (2022.01)

(52) U.S. Cl.
CPC .............. *G06T 17/10* (2013.01); *G06T 19/20* (2013.01); *G06V 10/44* (2022.01); *G06V 10/54* (2022.01); *G06V 10/764* (2022.01); *G06V 10/774* (2022.01); *G06V 10/82* (2022.01); *G06V 20/647* (2022.01); *G06V 40/10* (2022.01); *G06V 40/171* (2022.01)

(58) Field of Classification Search
CPC . G06T 2207/10004; G06T 2207/20081; G06T 2207/20084; G06T 2207/30196; G06T 7/529; G06V 10/44; G06V 10/54; G06V 10/764; G06V 10/774; G06V 10/82; G06V 20/647; G06V 40/10; G06V 40/171
See application file for complete search history.

(56) References Cited

U.S. PATENT DOCUMENTS

| | | |
|---|---|---|
| 2019/0035149 A1 | 1/2019 | Chen et al. |
| 2022/0058407 A1* | 2/2022 | Yang ..................... G06T 11/001 |
| 2022/0180597 A1* | 6/2022 | Miyamoto ................ G06T 7/90 |

* cited by examiner

3D DATASET GENERATION FOR NEURAL NETWORK MODEL TRAINING

CROSS-REFERENCE TO RELATED APPLICATIONS/INCORPORATION BY REFERENCE

This application claims priority to U.S. Provisional Patent Application Ser. No. 63/003,028 filed on Mar. 31, 2020, the entire content of which is hereby incorporated herein by reference.

FIELD

Various embodiments of the disclosure relate to training and deployment of a neural network. More specifically, various embodiments of the disclosure relate to an electronic device and a method for generation of a 3D dataset to train a neural network on a task of 3D reconstruction from a 2D image.

BACKGROUND

Advancements in the field of computer graphics have led to development of various techniques for three-dimensional (3D) modeling or 3D reconstruction of objects. 3D models have applications in various domains, such as extended reality, animation, gaming, interior designing, architecture, and medicine. Many conventional solutions for 3D modelling or 3D reconstruction use an RGB-depth camera or a 3D scanning setup to scan an object of interest and to acquire depth information and color/texture information of the object. Having a scanning setup may not be efficient for 3D reconstruction, especially when a large number of 3D models of various objects are required for certain applications.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for generation of a three-dimensional (3D) dataset for training of a neural network model is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic device and method for generation of a dataset for training of a neural network model on a task of 3D reconstruction from a single 2D image. Exemplary aspects of the disclosure provide an electronic device that may be configured to detect a plurality of two-dimensional (2D) landmarks on a first 2D image of an object of interest (for example, a face of a human subject). The detected plurality of 2D landmarks may correspond to shape-features (such as eyes, nose and jaw line) of the object of interest (such as the face of the human subject). The electronic device may further align a first three-dimensional (3D) shape model (such as a 3D morphable model) of a reference object (for example, a face of a reference human subject) by fitting corresponding 2D landmarks of the first 3D shape model to the detected plurality of 2D landmarks of the object of interest. The electronic device may further estimate texture mapping information (such as skin color information and facial hair information) between the object of interest of the first 2D image and the aligned first 3D shape model. The electronic device may generate a dataset by including the first 2D image, the aligned first 3D shape model, and the estimated texture mapping information as a first sample of the dataset.

In conventional 3D modeling techniques, a 3D imaging sensor may be used for scanning the object of interest (such as the face of the human subject), which may be expensive or may require one or more setups, especially when a large number of scans are required. In contrast, the present disclosure may utilize 2D images (which may be acquired from any commonly available camera or any public image library) for generation of a dataset to train the neural network model on a task of 3D reconstruction from 2D images.

At times, development a 3D model (such as a face model) through conventional 3D modeling techniques may require substantial manual effort and specialized software, thereby making the process time consuming and cumbersome. However, in the present disclosure, the electronic device may train the neural network model on the task of 3D reconstruction from a single 2D image, based on the dataset. Once trained, the neural network model may output a textured or untextured 3D model of object depicted in an input image (fed to the neural network model as input), thereby making the process of 3D modeling easy to perform with a minimum manual effort. Further, the conventional 3D modeling techniques may require additional texture mapping techniques. Whereas the electronic device of the present disclosure may train the neural network model for texture mapping and to generate a textured 3D model of the object of interest, thereby reducing the complexity associated with implementation of texture mapping techniques.

Figure 1:
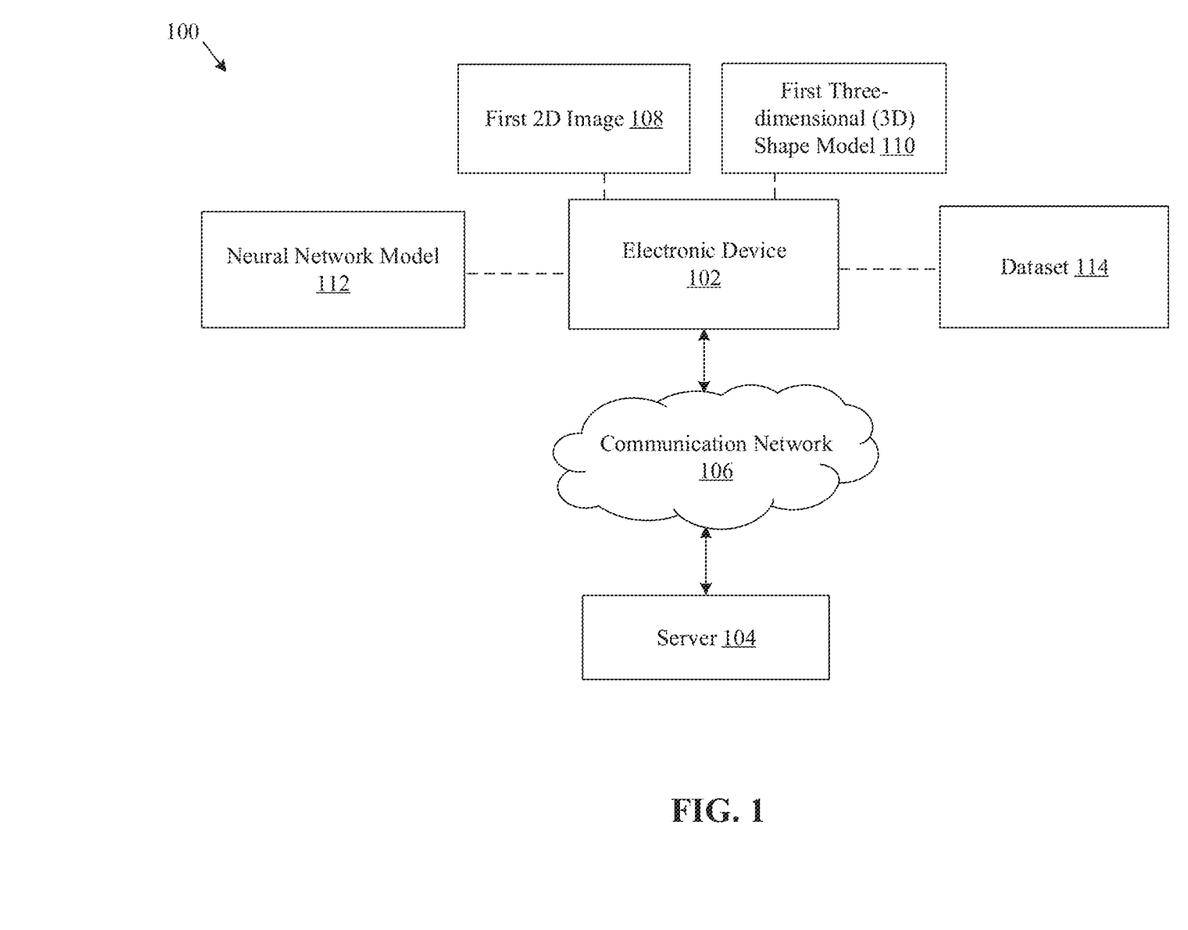
FIG. 1 is a block diagram that illustrates an exemplary network environment for generation of a dataset for training of a neural network model on a task of 3D reconstruction from a two-dimensional (2D) image, in accordance with an embodiment of the disclosure.

FIG. 1 is a block diagram that illustrates an exemplary network environment for generation of a dataset for training of a neural network model on a task of 3D reconstruction from a two-dimensional (2D) image, in accordance with an embodiment of the disclosure. With reference to FIG. 1, there is shown a network environment 100. The network environment 100 may include an electronic device 102 and a server 104. The network environment 100 may further include a communication network 106. The electronic device 102 and the server 104 may communicate via the communication network 106. Shown as an example, the server 104 may store a first 2D image 108 of an object of interest and a first three-dimensional (3D) shape model 110 of a reference object. The object of interest may belong to the same object class as that of the reference object. In FIG. 1, there is further shown a neural network model 112, which may be trained on the electronic device 102.

The electronic device 102 may include suitable logic, circuitry, and interfaces that may be configured to train a neural network model 112 on a task of 3D reconstruction of an object of interest (i.e. an object belonging to a particular object class) from a 2D image of the object. The neural network model 112 may be trained based on a dataset 114. For training, the electronic device 102 may generate the dataset 114, which may include a plurality of samples. Each of such samples may include an input-output pair of, for example, a 2D image of an object and a corresponding 3D shape model of the object in the 2D image. Additionally, each sample may include texture mapping information between the object of the 2D image and the 3D shape model. Examples of the electronic device 102 may include, but are not limited to, a computing device, a smartphone, a mobile phone, a gaming device, a mainframe machine, a server, a computer work-station, and/or a consumer electronic (CE) device.

The server 104 may include suitable logic, circuitry, and interfaces, and/or code that may be configured to store a set of 2D images that may include the first 2D image 108. The server 104 may further be configured to store the first 3D shape model 110, which may be a 3D morphable model of a reference object. For example, if the reference object is a face of a human subject, then the first 3D shape model 110 may be a 3D morphable face model of the human subject. As a morphable model, the first 3D shape model 110 may be used as a prior for reconstruction of a 3D shape model of an object of interest from a 2D image of the object of interest. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and electronic device 102 as two separate entities. In certain embodiments, the functionalities of the server 104 may be incorporated in its entirety or at least partially in the electronic device 102, without a departure from the scope of the disclosure.

The communication network 106 may include a communication medium through which the electronic device 102 and the server 104 may communicate with each other. For example, the electronic device 102 may receive the first 2D image 108 and the first 3D shape model 110 from the server 104 via the communication network 106. The communication network 106 may be one of a wired connection or a wireless connection. Examples of the communication network 106 may include, but are not limited to, the Internet, a cloud network, a Wireless Fidelity (Wi-Fi) network, a mobile wireless network (such as Long-term Evolution or 5th Generation New Radio (5G NR)) a Personal Area Network (PAN), a Local Area Network (LAN), or a Metropolitan Area Network (MAN). Various devices in the network environment 100 may be configured to connect to the communication network 106 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The neural network model 112 may be a computational network or a system of artificial neurons, arranged in a plurality of layers, as nodes. The plurality of layers of the neural network model 112 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model 112. Outputs of each hidden layer may be coupled to inputs of at least one node in other layers of the neural network model 112. Node(s) in the final layer may receive inputs from at least one hidden layer to output a result. The number of layers and the number of nodes in each layer may be determined from parameters of the neural network model 112. Such parameters may be set before or while training the neural network model 112 on the dataset 114.

Each node of the neural network model 112 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network model 112. All or some of the nodes of the neural network model 112 may correspond to same or a different mathematical function.

In training of the neural network model 112, one or more parameters of each node of the neural network model 112 may be updated based on whether an output of the final layer for a given input (from the dataset 114) matches a correct result based on a loss function for the neural network model 112. The above process may be repeated for same or a different input until a minima of loss function is achieved and a training error is minimized. Several methods for training are known in art, for example, gradient descent, stochastic gradient descent, batch gradient descent, gradient boost, meta-heuristics, and the like.

In an embodiment, the neural network model 112 may include electronic data, which may be implemented as, for example, a software component of an application executable on the electronic device 102. The neural network model 112 may rely on libraries, external scripts, or other logic/instructions for execution by a processing device, such as the electronic device 102. The neural network model 112 may enable a computing device, such as the electronic device 102 to perform one or more operations associated with 3D reconstruction of an object of interest (for example, a 3D human face) from a single 2D image (for example, an image of a face of the human subject). Additionally or alternatively, the neural network model 112 may be implemented using hardware including a processor, a co-processor (such as an Artificial Intelligence (AI) accelerator chip), a microprocessor, a field-programmable gate array (FPGA), or an application-specific integrated circuit (ASIC). In some embodiments, the neural network model 112 may be implemented using a combination of both hardware and software.

Examples of the neural network model 112 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, a You Only Look Once (YOLO) network, CNN+ANN, LSTM+ANN, a gated recurrent unit (GRU)-based RNN, a fully connected neural network, a deep Bayesian neural network, a Generative Adversarial Network (GAN), and/or a combination of such networks. In certain embodiments, the neural network model 112 may be based on a hybrid architecture of multiple Deep Neural Networks (DNNs).

In operation, the electronic device 102 may be configured to receive a set of 2D images. Such images may be received from the server 104 or from any data storage system, such as, but not limited to, a camera or a multi-camera setup, a workstation, a storage drive, a smartphone, or a combination thereof. The set of 2D images may include at least the first 2D image 108 of an object of interest (such as the face of the human subject). The object of interest may belong to a particular object class, to which all or most of the remaining images in the received set of 2D images may be belong to. For example, if the object of interest is a human face, all or most of the images in the received set of 2D image may be face images of one or more human subjects. In an embodiment, the object of interest may be an animate object or an inanimate object. Examples of the animate objects may include, but are not limited to, a face of a human subject, a body of the human subject, or an anatomical portion different from the body and the face of the human subject. Examples of the inanimate objects may include, but are not limited to, toys, equipment, infrastructure, such as buildings or houses, or furniture.

In some embodiments, the received set of 2D images may include several object variations to have a balanced composition and to avoid any bias in the dataset 114, which may be generated based on such images. For instance, if the object of interest is the human face, variations may mean that face images of a population set may include people of different genders, age groups, race, color, or ethnicity.

In order to generate the dataset 114, the electronic device 102 may iteratively execute a set of operations to obtain each sample for the dataset 114 from a corresponding 2D image of the received set of 2D images. Such operations are briefly described herein for the first 2D image 108.

The electronic device 102 may be configured to detect a plurality of 2D landmarks on the first 2D image 108. The detected plurality of 2D landmarks may correspond to shape-features of the object of interest. For example, if the first 2D image 108 is a face image of a human subject, the plurality of 2D landmarks may be detected on shape-features, such as of eyes, nose, lips, eyebrows, and jawline in the first 2D image 108 of the object of interest (such as the face of a human subject). Each 2D landmark of the plurality of 2D landmarks may be defined by 2D image. Details of the detection of the plurality of 2D landmarks are further provided, for example, at 304 in FIG. 3.

The electronic device 102 may acquire the first 3D shape model 110 of a reference object, which may belong to the same object class to which to the object of interest may belong. The first 3D shape model 110 may be acquired from the server 104 or from any data storage system. The first 3D shape model 110 may be a 3D morphable model (such as a Basel model) of the reference object. By way of example, and not limitation, such a model may be a mean-shape model of several 3D meshes associated with an object type/class.

After acquisition, the electronic device 102 align the first 3D shape model 110 of the reference object. The alignment may be done by fitting corresponding 2D landmarks of the first 3D shape model 110 to the detected plurality of 2D landmarks of the object of interest. For example, 2D landmarks corresponding to the shape features of a face in the first 3D shape model 110 may be fitted with the 2D landmarks detected on the face in the first 2D image 108. The aligned first 3D shape model 110 may have shape-features which map to positions of corresponding shape-features of the object of interest in the first 2D image 108. Details of the alignment of the first 3D shape model 110 are further provided, for example, at 306 in FIG. 3.

In accordance with an embodiment, the electronic device 102 may extract a plurality of 3D landmarks from the aligned first 3D shape model 110. Each 3D landmark of the extracted plurality of 3D landmarks may include 3D coordinates, such as x, y, and z coordinates of a 3D point on a corresponding shape-feature (for example, a 3D point on nose) of the aligned first 3D shape model 110. The extracted plurality of 3D landmarks may be utilized for training the neural network model 112. Details of the extraction of the plurality of 3D landmarks are further provided, for example, at 308 in FIG. 3.

The electronic device 102 may estimate texture mapping information between the object of interest of the first 2D image 108 and the aligned first 3D shape model 110. By way of example, and not limitation, the texture mapping information may include a dense correspondence for color or texture between the aligned 3D shape model and the first 2D image 108. In some embodiments, the texture mapping information may include a 2D texture map (e.g., in terms of UV coordinates) to represent a texture or appearance of the object of interest (such as the face of the human subject). The texture mapping information may also include color information of a surface of the object of interest. Details of the estimation of the texture mapping information are further provided, for example, at 310 in FIG. 3.

The electronic device 102 may generate the dataset 114 by including the first 2D image 108, the aligned first 3D shape model 110, and the estimated texture mapping information as a first sample of the dataset 114. In some embodiments, the dataset 114 may further include the plurality of 2D landmarks and/or the plurality of 3D landmarks as part of the first sample of the dataset 114. Details of the generation of the dataset 114 are further provided, for example, at 312 in FIG. 3.

The electronic device 102 may train the neural network model 112 on a task of 3D reconstruction from a single 2D image, based on the generated dataset 114. Details of the training of the neural network model 112 are further provided, for example, at 314 in FIG. 3. Once training is over, the trained neural network model 112 may reconstruct a textured or an untextured 3D model of an object of interest (such as a human face) for a given input which may include a 2D image of the object of interest.

Figure 2:
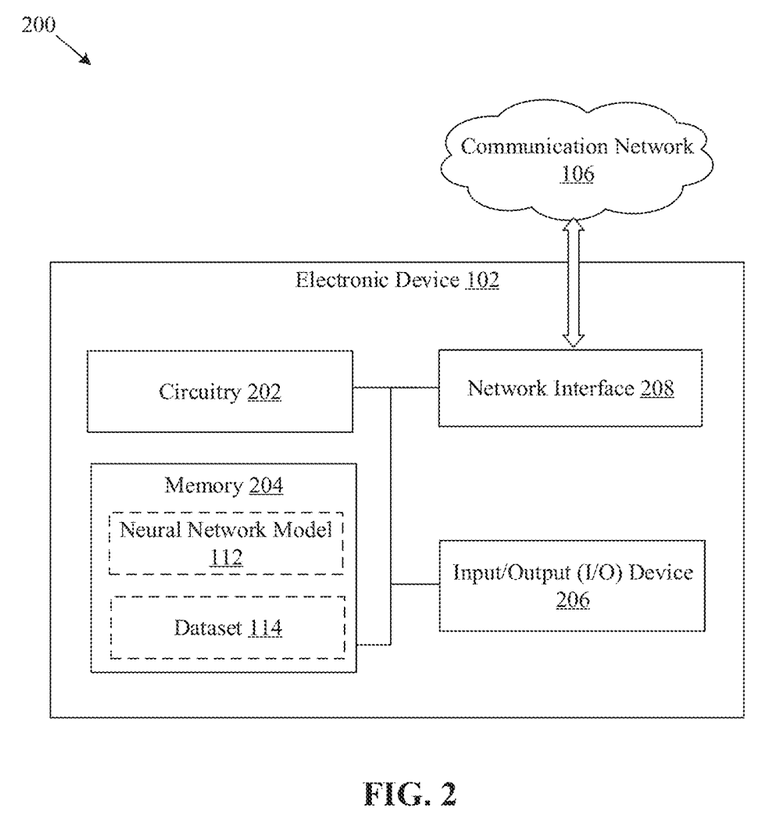
FIG. 2 is a block diagram that illustrates an exemplary electronic device for generation of a dataset for training of a neural network model on a task of 3D reconstruction from a single 2D image, in accordance with an embodiment of the disclosure.

FIG. 2 is a block diagram that illustrates an exemplary electronic device for generation of a dataset for training of a neural network model on a task of 3D reconstruction from a single 2D image, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, the Input/Output (I/O) device 206, and a network interface 208. The circuitry 202 may be communicatively coupled to the memory 204, the I/O device 206, and the network interface 208. In some embodiments, the memory 204 may include the dataset 114 and the neural network model 112.

The circuitry 202 may include suitable logic, circuitry, and interfaces that may be configured to execute program instructions associated with different operations to be executed by the electronic device 102. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the program instructions to be executed by the circuitry 202. The memory 204 may be configured to store the dataset 114 and the neural network model 112. The memory 204 may be also configured to store the set of 2D images, the plurality of 2D landmarks of the first 2D image 108, and the plurality of 3D landmarks of the aligned first 3D shape model. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input from a user and provide an output based on the received input. The I/O device 206 which may include various input and output devices, may be configured to communicate with the circuitry 202. For example, the electronic device 102 may receive a user input via the I/O device 206 to receive the first 2D image 108 from the server 104. The I/O device 206, such as a display may render inputs and/or outputs of the neural network model 112 before or after the neural network model 112 is trained. Examples of the I/O device 206 may include, but are not limited to, a touch screen, a display device, a keyboard, a mouse, a joystick, a microphone, and a speaker.

The network interface 208 may include suitable logic, circuitry, and interfaces that may be configured to facilitate communication between the circuitry 202 and the server 104, via the communication network 106. The network interface 208 may be implemented by use of various known technologies to support wired or wireless communication of the electronic device 102 with the communication network 106. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5G NR, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions or operations executed by the electronic device 102, as described in FIG. 1, may be performed by the circuitry 202. Operations executed by the circuitry 202 are described in detail, for example, in FIG. 3.

Figure 3:
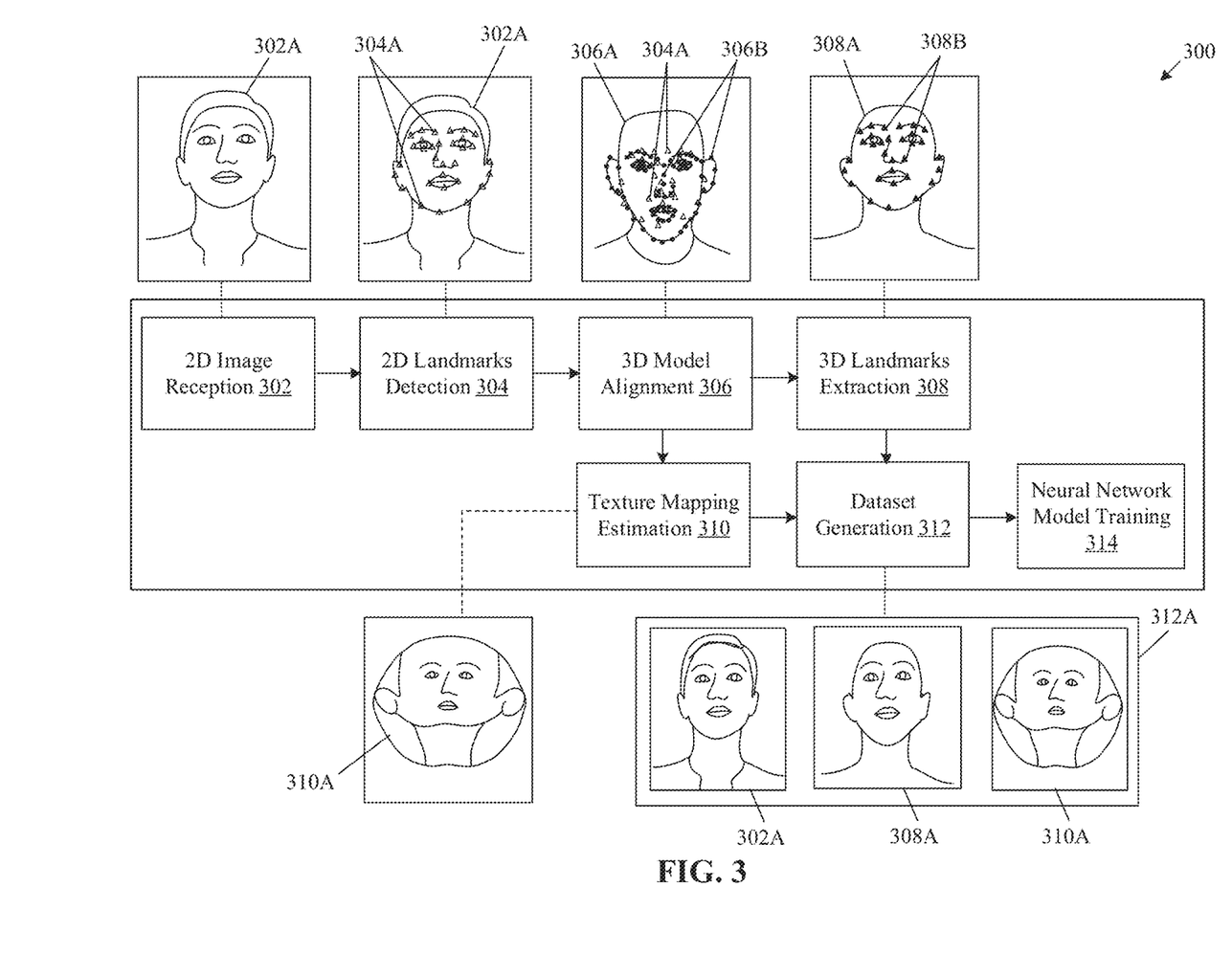
FIG. 3 is a diagram that illustrates exemplary operations for training a neural network model on a task of 3D reconstruction from a single 2D image, in accordance with an embodiment of the disclosure.

FIG. 3 is a diagram that illustrates exemplary operations for training a neural network model on a task of 3D reconstruction from a single 2D image, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 314, as described herein. The exemplary operations illustrated in block diagram 300 may start at 302 and may be performed by any computing system, apparatus, or device, such as by the electronic device 102 of FIG. 1 or FIG. 2.

At 302, the set of 2D images that includes a first 2D image 302A of the object of interest may be received. In accordance with an embodiment, the circuitry 202 may be configured to receive the set of 2D images that may include the first 2D image 302A of the object of interest. In accordance with an embodiment, the object of interest may be an animate object or an inanimate object. Examples of the animate object may include, but are not limited to, a body of a human subject, the face of the human subject, any anatomical portion different from the body and the face of the human subject, or an animal, such as a dog or a cat. Examples of the inanimate object may include, but are not limited to, a chair, a car, a toy, or an infrastructure, such as buildings. As shown, for example, the object of interest in the first 2D image 302A is the face of a human subject.

At 304, a plurality of 2D landmarks 304A may be detected on the first 2D image 302A. In accordance with an embodiment, the circuitry 202 may be configured to detect the plurality of 2D landmarks 304A on the first 2D image 302A. Such detection may be done based on application of techniques, such as, but not limited to, Histogram of Oriented Gradients (HOG) and Support Vector Machine (SVM), Local Binary Patterns (LBP) cascade, or HAAR on the first 2D image 302A. The detected plurality of 2D landmarks 304A may correspond to shape-features of the object of interest. For example, if the object of interest is a face, such shape-features may include eyes, nose, ears, lips, jawline, and the like. Each of the plurality of 2D landmarks 304A may be represented in terms of 2D image coordinates. Additionally, an index value may be assigned to each of the plurality of 2D landmarks 304A. For example, if there are 68 landmarks on the first 2D image 302A, each of the 68 landmarks may be assigned a unique index from a set of indices (1, 2, 3 . . . 68).

At 306, a first 3D shape model 306A of the reference object may be aligned by fitting corresponding 2D landmarks (such as a plurality of 2D landmarks 306B) of the first 3D shape model 306A to the detected plurality of 2D landmarks 304A of the object of interest. In accordance with an embodiment, the circuitry 202 may be configured to align the first 3D shape model 306A by fitting corresponding 2D landmarks (such as the plurality of 2D landmarks 306B) of the first 3D shape model 306A to the detected plurality of 2D landmarks 304A of the object of interest.

Prior to the alignment, the circuitry 202 may receive the first 3D shape model 306A from the server 104 or any data storage system. The first 3D shape model 306A may be a 3D morphable model or a 3D Basel model of the reference object, such as a human face. If the reference object is a human face, then the 3D morphable model or the 3D Basel model may be referred to as a generative shape model of a human face and may be obtained from registered 3D scans of several male and female face (such as 100 male and 100 female faces). By way of example, and not limitation, the 3D Basel face model may include a 3D morphable face model (with shape and texture), attribute vectors for gender, height, weight, and age, and feature point positions and vertex indices.

In accordance with an embodiment, the circuitry 202 may be configured to solve an objective function to minimize a distance between the corresponding 2D landmarks (such as the plurality of 2D landmarks 306B) of the first 3D shape model 306A and the detected plurality of 2D landmarks 304A of the object of interest in the first 2D image 302A. In such a case, the fitting may correspond to solving the objective function (or to minimize the objective function). In accordance with an embodiment, to align the first 3D shape model 306A, vertex positions which may be neighboring to 2D landmarks of the first 3D shape model 306A may also be updated while determining correspondence between the plurality of 2D landmarks 304A and the plurality of 2D landmarks 306B. Once the alignment is done, an aligned first 3D shape model 308A may be obtained. The aligned model may have shape-features aligned to that of the face of the human subject in the first 2D image 302A.

At 308, a plurality of 3D landmarks 308B may be extracted. In accordance with an embodiment, the circuitry 202 may be configured to extract the plurality of 3D landmarks 308B from the aligned first 3D shape model 308A. The plurality of 3D landmarks 308B may determine corresponding 3D locations of shape-features, such as eyes, nose, lips, ears, jaw line of the aligned first 3D shape model 308A in 3D space. Each 3D landmark of the extracted plurality of 3D landmarks 308B may include 3D coordinates, such as x, y, and z coordinates of a 3D point on a corresponding shape-feature (for example, a 3D point on nose) of the aligned first 3D shape model 308A. In an embodiment, when the first 3D shape model 306A is aligned, vertex positions corresponding to the plurality of 2D landmarks 306B of the first 3D shape model 306A may be updated. The updated vertex positions may be used to determine x, y, z coordinates of each 3D landmark.

At 310, texture mapping information 310A between the object of interest of the first 2D image 302A and the aligned first 3D shape model 308A may be estimated. In accordance with an embodiment, the circuitry 202 may be configured to estimate the texture mapping information 310A between the object of interest of the first 2D image 302A and the aligned first 3D shape model 308A. For example, for every triangle or polygon of the aligned first 3D shape model 308A, the texture mapping information 310A may include a mapping for a corresponding patch of texture or color information from the first 2D image 302A. In an embodiment, the texture mapping information 310A may be a texture map or a UV map of the object of interest (for example, the face of the human subject in the first 2D image 302A). The texture map or the UV map may define a surface texture or color information applicable on the aligned first 3D shape model 308A. The "U" and "V" of the UV map may represent 2D coordinates of texture values obtained from the first 2D image 302A.

In an embodiment, the texture mapping information 310A may also include texture information for various facial features, such as facial hair on the face of the human subject in the first 2D image 302A, wrinkles and fine lines on the face of the human subject in the first 2D image 302A, moles on the face of the human subject in the first 2D image 302A, and so forth. The texture mapping information 310A may also include the color information for various features, such as skin color of the human subject in the first 2D image 302A, color of eyes of the human subject in the first 2D image 302A, hair color of the human subject in the first 2D image 302A, and so forth.

At 312, a dataset 312A may be generated by including the first 2D image 302A, the aligned first 3D shape model 308A, and the estimated texture mapping information 310A as a first sample of the dataset 312A. In accordance with an embodiment, the circuitry 202 may be configured to generate the dataset 312A by including the first 2D image 302A, the aligned first 3D shape model 308A, and the estimated texture mapping information 310A as the first sample of the dataset 312A. In some embodiments, the dataset 312A may further include the detected plurality of 2D landmarks 304A on the first 2D image 302A and the extracted plurality of 3D landmarks 308B in the first sample of the dataset 312A.

It should be noted that operations from 304 to 312 may be repeated for each 2D image in the received set of images (at 302) to include more samples in the dataset 312A. Once more samples are included, the dataset 312A may include N number of 2D images, N number of aligned 3D shape models corresponding to N number of 2D images, N instances of texture mapping information, and N sets of 2D and 3D landmarks corresponding to N number of 2D images.

At 314, based on the generated dataset 312A, the neural network model 112 may be trained on the task of 3D reconstruction from a single 2D image. In accordance with an embodiment, the circuitry 202 may be configured to train the neural network model 112 based on the generated dataset 312A. By way of example, and not limitation, for the first sample of the dataset 312A, the neural network model 112 may be trained to learn a first mapping between the first 2D image 302A of the object of interest and the aligned first 3D shape model 308A of the object of interest. The neural network model 112 may be further trained to learn a second mapping of texture (i.e. a dense correspondence) between the aligned first 3D shape model 308A and the first 2D image 302A.

In an embodiment the circuitry 202 may feed the first 2D image 302A, annotated with the plurality of 2D landmarks 304A as an input to a first network of the neural network model 112. The first network of the neural network model 112 may be trained to learn a correspondence (or a mapping) between the plurality of 2D landmarks 304A of the first 2D image 302A and the plurality of 3D landmarks 308B of the aligned first 3D shape model 308A. The first network of the neural network model 112 may be configured to output an aligned 3D shape model of the object of interest, based on the learned correspondence. The output, i.e. the aligned 3D shape model may fit the shape-features of the object of interest in the first 2D image 302A. In training, information, such as the aligned first 3D shape model 308A and the plurality of 3D landmarks 308B in the first sample of the dataset 312A may be used as a ground truth to update the parameters, such as neural weights of the first network. Based on the accuracy of the output, the weights may be adjusted for each input to the first network of the neural network model 112.

The neural network model 112 may also include a second network, which may be trained to learn a dense correspondence of texture between the first 2D image 302A and the aligned first 3D shape model 308A. From the dataset 312A, the texture mapping information 310A may be used as a ground truth to measure loss/accuracy of the second network and to update parameters, such as weights of the second network. Once trained, the second network may be configured to output texture mapping information for an untextured 3D shape model. In some instances, the neural network model 112 may output a textured 3D shape model based on outputs of the first network and the second network for an input 2D image. The neural network model 112, when trained, may be used to output accurate 3D shape models, without use of complex texture mapping techniques, thereby reducing the work in generating 3D models.

It should be noted that the human face in the first 2D image 302A is presented merely as an example of the object of interest. The present disclosure may be also applicable to other types of objects of interest, such as other animate objects or inanimate objects. A description of other types of objects of interest has been omitted from the disclosure for the sake of brevity.

Although illustrated with discrete blocks, the exemplary operations associated with one or more blocks of the block diagram 300 may be divided into additional blocks, combined into fewer blocks, or eliminated, depending on implementation of the exemplary operations.

Figure 4:
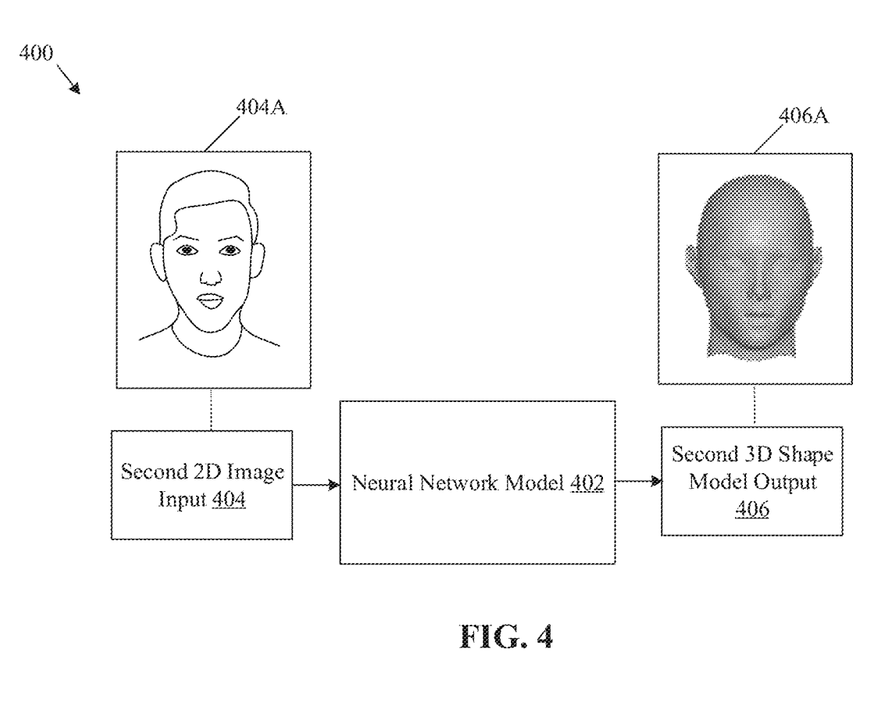
FIG. 4 is a block diagram that illustrates exemplary operations associated with a trained neural network model of FIG. 3, in accordance with an embodiment of the disclosure.

FIG. 4 is a block diagram that illustrates exemplary operations associated with a trained neural network model of FIG. 3, in accordance with an embodiment of the disclosure. FIG. 4 is explained in conjunction with elements from FIGS. 1, 2, and 3. With reference to FIG. 4, there is shown a block diagram 400 that illustrates a neural network model 402. The neural network model 402 may be an exemplary implementation of the neural network model 112 and may be trained on the dataset 312A. The block diagram 400 illustrates exemplary operations 404 and 406, as described herein. The exemplary operations illustrated in block diagram 400 may start at 404 and may be performed by any computing system, such as by the circuitry 202 of FIG. 2.

At 404, the neural network model 402 (trained at 312, for example) may receive a second 2D image 404A of the object of interest as an input. In some embodiments, the circuitry 202 may input the second 2D image 404A to the neural network model 402. The second 2D image 404A may be a part of an unseen dataset of images (for example, human face images which may have not been used in past in the training of the neural network model 402). The second 2D image 404A may not be a part of the dataset 312A on which the neural network model 402 may be trained. As shown, for example, the second 2D image 404A may be an image of a human face different from that in the first 2D image 302A.

At 406, the neural network model 402 may output a second 3D shape model 406A corresponding to the object of interest in the second 2D image 404A. The output may be based on the input (i.e. the second 2D image 404A). The second 3D shape model 406A may resemble the shape-features and the texture on the object of interest in the second 2D image 404A.

Although illustrated with discrete blocks, the exemplary operations associated with one or more blocks of the block diagram 400 may be divided into additional blocks, combined into fewer blocks, or eliminated, depending on implementation of the exemplary operations.

Figure 5:
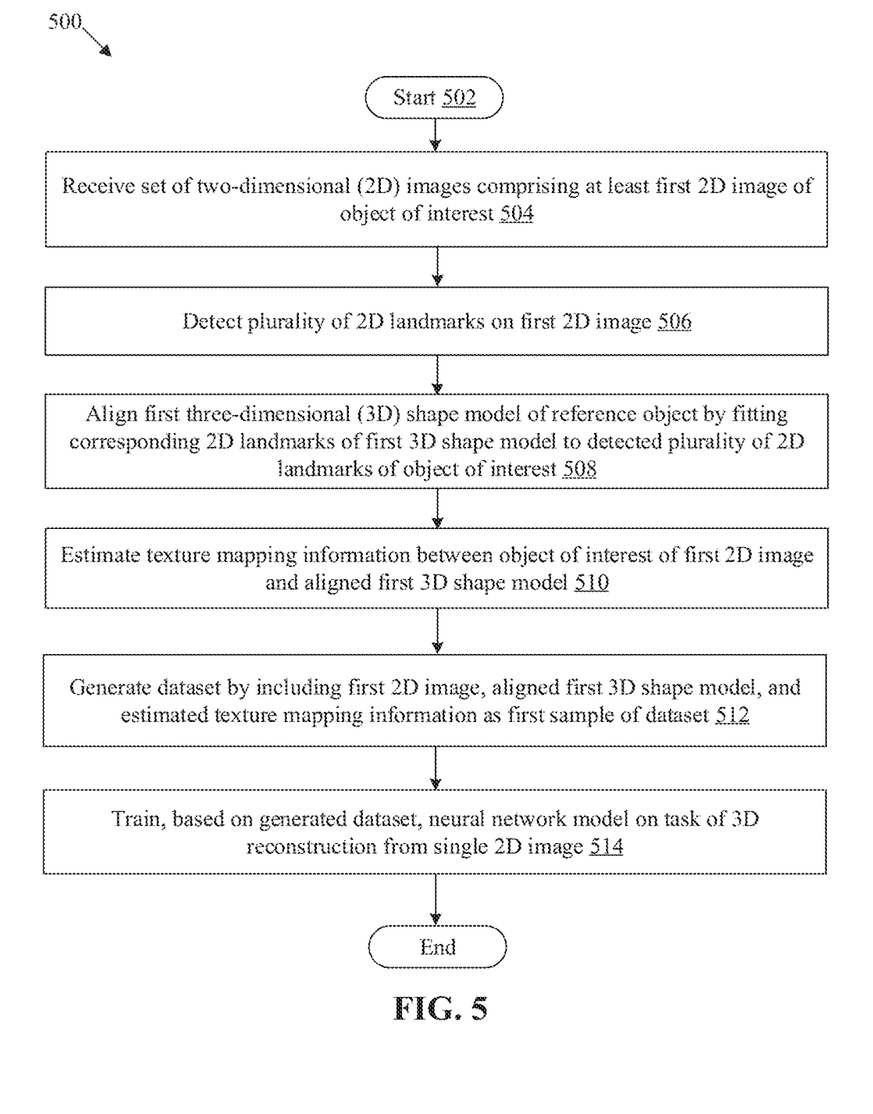
FIG. 5 is a flowchart that illustrates an exemplary method for generation of a dataset to train a neural network model on a task of 3D reconstruction from a single 2D image, in accordance with an embodiment of the disclosure.

FIG. 5 is a flowchart that illustrates an exemplary method for generation of a dataset to train a neural network model on a task of 3D reconstruction from a single 2D image, in accordance with an embodiment of the disclosure. FIG. 5 is explained in conjunction with elements from FIGS. 1, 2, 3, and 4. With reference to FIG. 5, there is shown a flowchart 500. The method illustrated in the flowchart 500 may be executed by any computing system, such as by the electronic device 102 or the circuitry 202. The method may start at 502 and proceed to 504.

At 504, a set of 2D images that includes at least a first 2D image (such as the first 2D image 302A) of an object of interest may be received. In accordance with an embodiment, the circuitry 202 may be configured to receive the set of 2D images that includes at least the first 2D image 302A of the object of interest. Details of the reception of the set of 2D images are further provided, for example, in FIG. 3.

At 506, a plurality of 2D landmarks (such as the plurality of 2D landmarks 304A) may be detected on the first 2D image 302A. In accordance with an embodiment, the circuitry 202 may be configured to detect the plurality of 2D landmarks 304A on the first 2D image 302A. The detected plurality of 2D landmarks 304A may correspond to shape-features of the object of interest. Details of the detection of the plurality of 2D landmarks 304A are further provided, for example, in FIG. 3.

At 508, a first 3D shape model (such as the first 3D shape model 306A) of a reference object may be aligned by fitting corresponding 2D landmarks (such as the plurality of 2D landmarks 306B) of the first 3D shape model 306A to the detected plurality of 2D landmarks 304A of the object of interest. In accordance with an embodiment, the circuitry 202 may be configured to align the of the reference object by fitting the corresponding 2D landmarks (such as the plurality of 2D landmarks 306B) of the first 3D shape model 306A to the detected plurality of 2D landmarks 304A of the object of interest. Details of the alignment of the first 3D shape model 306A are further provided, for example, in FIG. 3.

At 510, texture mapping information (such as the texture mapping information 310A) may be estimated between the object of interest of the first 2D image 302A and the aligned first 3D shape model 308A. In accordance with an embodiment, the circuitry 202 may be configured to estimate the texture mapping information 310A between the object of interest of the first 2D image 302A and the aligned first 3D shape model 308A. Details of the estimation of the texture mapping information 310A are further provided, for example, in FIG. 3.

At 512, a dataset (such as the dataset 312A) may be generated that may include the first 2D image 302A, an aligned first 3D shape model (such as the aligned first 3D shape model 308A), and the estimated texture mapping information 310A as a first sample of the dataset 312A. In accordance with an embodiment, the circuitry 202 may be configured to generate the dataset 312A that may include the first 2D image 302A, the aligned first 3D shape model 308A), and the estimated texture mapping information 310A as a first sample of the dataset 312A. Details of the generation of the dataset 312A are further provided, for example, in FIG. 3.

At 514, a neural network model (such as the neural network model 112) may be trained on a task of 3D reconstruction from a single 2D image, based on the generated dataset 312A. In accordance with an embodiment, the circuitry 202 may be configured to train the neural network model 112 on the task of 3D reconstruction from a single 2D image, based on the generated dataset 312A. Details of the training of the neural network model 112 are further provided, for example, in FIG. 3. Control may pass to end.

Although the flowchart 500 is illustrated as discrete operations, such as 502, 504, 506, 508, 510, 512 and 514, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate an electronic device (such as the electronic device 102). The instructions may cause the machine and/or computer to perform operations that may include receiving a set of two-dimensional (2D) images comprising at least a first two-dimensional (2D) image (such as the first 2D image 302A) of an object of interest. The operations may further include detecting a plurality of 2D landmarks (such as the plurality of 2D landmarks 304A) on the first 2D image 302A. The detected plurality of 2D landmarks 304A may correspond to shape-features of the object of interest. The operations may further include aligning a first three-dimensional (3D) shape model (such as the first 3D shape model 306A) of a reference object by fitting corresponding 2D landmarks (such as the plurality of 2D landmarks 306B) of the first 3D shape model 306A to the detected plurality of 2D landmarks 304A of the object of interest. The operations may further include estimating texture mapping information (such as the texture mapping information 310A) between the object of interest of the first 2D image 302A and the aligned first 3D shape model (such as the aligned first 3D shape model 308A). The operations may further include generating a dataset (such as the dataset 312A) by including the first 2D image 302A, the aligned first 3D shape model 308A, and the estimated texture mapping information 310A as a first sample of the dataset 312A. The operations may further include training, based on the generated dataset 312A, a neural network model (such as the neural network model 112) on a task of 3D reconstruction from a single 2D image.

Exemplary aspects of the disclosure may provide an electronic device (such as the electronic device 102 of FIG. 1) that includes circuitry (such as the circuitry 202). The circuitry 202 may be configured to receive a set of two-dimensional (2D) images comprising at least a first two-dimensional (2D) image (such as the first 2D image 302A) of an object of interest. The circuitry 202 may be further configured to detect a plurality of 2D landmarks (such as the plurality of 2D landmarks 304A) on the first 2D image 302A. The detected plurality of 2D landmarks 304A may correspond to shape-features of the object of interest. The circuitry 202 may be further configured to align a first three-dimensional (3D) shape model (such as the first 3D shape model 306A) of a reference object by fitting corresponding 2D landmarks (such as the plurality of 2D landmarks 306B) of the first 3D shape model 306A to the detected plurality of 2D landmarks 304A of the object of interest. The circuitry 202 may be further configured to estimate texture mapping information (such as the texture mapping information 310A) between the object of interest of the first 2D image 302A and the aligned first 3D shape model (such as the aligned first 3D shape model 308A). The circuitry 202 may be further configured to generate a dataset (such as the dataset 312A) by including the first 2D image 302A, the aligned first 3D shape model 308A, and the estimated texture mapping information 310A as a first sample of the dataset 312A. The circuitry 202 may be further trained, based on the generated dataset 312A, a neural network model (such as the neural network model 112) on a task of 3D reconstruction from a single 2D image.

In accordance with an embodiment, the operations may further include extracting a plurality of 3D landmarks (such as the plurality of 3D landmarks 308B) from the aligned first 3D shape model 308A. The operations may further include generating the dataset 312A by including the extracted plurality of 3D landmarks and the detected plurality of 2D landmarks 304A in the first sample of the dataset 312A.

In accordance with an embodiment, the trained neural network model 402 may receive, as an input, a second 2D image (such as the second 2D image 404A) of the object of interest. The second 2D image 404A may be a part of an unseen dataset of images of the object of interest. The trained neural network model 402 may further output, based on the input, a second 3D shape model (such as the second 3D shape model 406A) corresponding to the object of interest in the second 2D image 404A.

In accordance with an embodiment, the first 3D shape model 306A may be one of a 3D morphable model or a 3D Basel model. In accordance with an embodiment, the object of interest may be one of an inanimate object or an animate object. In accordance with an embodiment, the object of interest may be one of a body of a human subject, a face of the human subject, or an anatomical portion different from the body and the face of the human subject.

In accordance with an embodiment, the circuitry 202 may be further configured to solve an objective function to minimize a distance between the corresponding 2D landmarks (such as the plurality of 2D landmarks 306B of the first 3D shape model 306A and the detected plurality of 2D landmarks 304A of the object of interest. The fitting may correspond to the solving of the objective function.

In accordance with an embodiment, each 3D landmark of the extracted plurality of 3D landmarks 308B may include 3D coordinates, such as x, y, and z coordinates of a 3D point on a corresponding shape-feature (for example, a 3D point on nose) of the aligned first 3D shape model 308A.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   receive a set of two-dimensional (2D) images comprising at least a first two-dimensional (2D) image of an object of interest;
   detect a plurality of 2D landmarks on the first 2D image, wherein the detected plurality of 2D landmarks corresponds to shape-features of the object of interest;
   align a first three-dimensional (3D) shape model of a reference object by fitting corresponding 2D landmarks of the first 3D shape model to the detected plurality of 2D landmarks of the object of interest;
   estimate texture mapping information between the object of interest of the first 2D image and the aligned first 3D shape model;
   generate a dataset by including the first 2D image, the aligned first 3D shape model, and the estimated texture mapping information as a first sample of the dataset; and
   train, based on the generated dataset, a neural network model on a task of 3D reconstruction from a single 2D image, wherein the trained neural network model:
      receives, as an input, a second 2D image of the object of interest, wherein the second 2D image is part of an unseen dataset of images of the object of interest; and
      outputs, based on the input, a second 3D shape model corresponding to the object of interest in the second 2D image.

2. The electronic device according to claim 1, wherein the circuitry is further configured to:
   extract a plurality of 3D landmarks from the aligned first 3D shape model; and
   generate the dataset by including the detected plurality of 2D landmarks and the extracted plurality of 3D landmarks in the first sample of the dataset.

3. The electronic device according to claim 2, wherein each 3D landmark of the extracted plurality of 3D landmarks comprises 3D coordinates of a 3D point on a corresponding shape-feature of the aligned first 3D shape model.

4. The electronic device according to claim 1, wherein the first 3D shape model is one of a 3D morphable model or a 3D Basel model.

5. The electronic device according to claim 1, wherein the object of interest is one of an inanimate object or an animate object.

6. The electronic device according to claim 1, wherein the object of interest is one of a body of a human subject, a face of the human subject, or an anatomical portion different from the body and the face of the human subject.

7. The electronic device according to claim 1, wherein the circuitry is further configured to solve an objective function to minimize a distance between the corresponding 2D landmarks of the first 3D shape model and the detected plurality of 2D landmarks of the object of interest, wherein the fitting corresponds to the solving of the objective function.

8. A method, comprising:
   in an electronic device:
   receiving a set of two-dimensional (2D) images comprising at least a first two-dimensional (2D) image of an object of interest;
   detecting a plurality of 2D landmarks on the first 2D image, wherein the detected plurality of 2D landmarks corresponds to shape-features of the object of interest;
   aligning a first three-dimensional (3D) shape model of a reference object by fitting corresponding 2D landmarks of the first 3D shape model to the detected plurality of 2D landmarks of the object of interest;
   estimating texture mapping information between the object of interest of the first 2D image and the aligned first 3D shape model;
   generating a dataset by including the first 2D image, the aligned first 3D shape model, and the estimated texture mapping information as a first sample of the dataset;
   training, based on the generated dataset, a neural network model on a task of 3D reconstruction from a single 2D image;
   receiving, by the trained neural network model, a second 2D image of the object of interest as an input, wherein the second 2D image is part of an unseen dataset of images of the object of interest; and
   outputting, by the trained neural network model, a second 3D shape model corresponding to the object of interest in the second 2D image, based on the input.

9. The method according to claim 8, further comprising:
   extracting a plurality of 3D landmarks from the aligned first 3D shape model; and
   generating the dataset by including the detected plurality of 2D landmarks and the extracted plurality of 3D landmarks in the first sample of the dataset.

10. The method according to claim 9, wherein each 3D landmark of the extracted plurality of 3D landmarks comprises 3D coordinates of a 3D point on a corresponding shape-feature of the aligned first 3D shape model.

11. The method according to claim 8, wherein the first 3D shape model is one of a 3D morphable model or a 3D Basel model.

12. The method according to claim 8, wherein the object of interest is one of an inanimate object or an animate object.

13. The method according to claim 8, wherein the object of interest is one of a body of a human subject, a face of the human subject, or an anatomical portion different from the body and the face of the human subject.

14. The method according to claim 8, further comprising solving an objective function to minimize a distance between the corresponding 2D landmarks of the first 3D shape model and the detected plurality of 2D landmarks of the object of interest, wherein the fitting corresponds to the solving of the objective function.

15. A non-transitory computer-readable medium having stored thereon computer-implemented instructions that, when executed by an electronic device, causes the electronic device to execute operations, the operations comprising:

receiving a set of two-dimensional (2D) images comprising at least a first two-dimensional (2D) image of an object of interest;

detecting a plurality of 2D landmarks on the first 2D image, wherein the detected plurality of 2D landmarks corresponds to shape-features of the object of interest;

aligning a first three-dimensional (3D) shape model of a reference object by fitting corresponding 2D landmarks of the first 3D shape model to the detected plurality of 2D landmarks of the object of interest;

estimating texture mapping information between the object of interest of the first 2D image and the aligned first 3D shape model;

generating a dataset by including the first 2D image, the aligned first 3D shape model, and the estimated texture mapping information as a first sample of the dataset;

training, based on the generated dataset, a neural network model on a task of 3D reconstruction from a single 2D image;

receiving, by the trained neural network model, a second 2D image of the object of interest as an input, wherein the second 2D image is part of an unseen dataset of images of the object of interest; and     outputting, by the trained neural network model, a second 3D shape model corresponding to the object of interest in the second 2D image, based on the input.

16. The non-transitory computer-readable medium according to claim 15, wherein the operations further comprises:

extracting a plurality of 3D landmarks from the aligned first 3D shape model; and     generating the dataset by including the detected plurality of 2D landmarks and the extracted plurality of 3D landmarks in the first sample of the dataset.

17. The non-transitory computer-readable medium according to claim 15, wherein the first 3D shape model is one of a 3D morphable model or a 3D Basel model.

18. The non-transitory computer-readable medium according to claim 15, wherein the object of interest is one of an inanimate object or an animate object.

* * * * *